(12) United States Patent
Chen et al.

(10) Patent No.: US 10,303,139 B2
(45) Date of Patent: May 28, 2019

(54) SYSTEM AND METHOD FOR MANAGING ELECTRICAL COMPONENTS FOR ENERGY USAGE

(71) Applicants: Jie Chen, Carmel, IN (US); Ali Razban, Carmel, IN (US); Stanley Yung-Ping Chien, Zionsville, IN (US); Amin Amini, Irvine, CA (US); Mustafa Saad Abdulwahhab Kamoona, Santa Clara, CA (US); Hamid Reza Piroozi, Fishers, IN (US)

(72) Inventors: Jie Chen, Carmel, IN (US); Ali Razban, Carmel, IN (US); Stanley Yung-Ping Chien, Zionsville, IN (US); Amin Amini, Irvine, CA (US); Mustafa Saad Abdulwahhab Kamoona, Santa Clara, CA (US); Hamid Reza Piroozi, Fishers, IN (US)

(73) Assignee: CREATIVE ESP INCORPORATED, Carmel, IN (US)

( * ) Notice: Subject to any disclaimer, the term of this patent is extended or adjusted under 35 U.S.C. 154(b) by 80 days.

(21) Appl. No.: 15/609,780

(22) Filed: May 31, 2017

(65) Prior Publication Data

US 2017/0351232 A1    Dec. 7, 2017

Related U.S. Application Data

(60) Provisional application No. 62/344,193, filed on Jun. 1, 2016.

(51) Int. Cl.
*G05B 15/02* (2006.01)
*G05B 15/00* (2006.01)
(Continued)

(52) U.S. Cl.
CPC ............. *G05B 15/02* (2013.01); *G05B 13/00* (2013.01); *G05B 15/00* (2013.01); *G05B 19/00* (2013.01)

(58) Field of Classification Search
None
See application file for complete search history.

(56) References Cited

U.S. PATENT DOCUMENTS

| 2015/0331435 A1* | 11/2015 | Mac ........................ G05F 1/625 |
| | | 700/298 |
| 2015/0378404 A1* | 12/2015 | Ogawa ................... G06F 1/206 |
| | | 700/300 |

(Continued)

OTHER PUBLICATIONS

Veleva;Sanja, et al., "Wireless smart platform for Home Energy Management System", Published in 2011 2nd IEEE PES International Conference and Exhibition on Innovative Smart Grid Technologies, pp. 1-8.*

*Primary Examiner* — Thomas C Lee
*Assistant Examiner* — Charles Cai

(57) ABSTRACT

A system for managing performance of one or more electrical components in real-time includes one or more sensors to provide working conditions of one or more energy consuming devices. The system further includes one or more actuators coupled to and configured to control the one or more energy consuming devices. Additionally, the system includes a computing device in electrical communication with the one or more sensors and the one or more actuators. The system also includes a database capable of retaining an instruction program for the computing device. The computing device includes a processor that is configured to receive data from the one or more sensors, analyze data from the one or more sensors, and execute the instruction program (Continued)

received from the database in order to optimize operation of the one or more energy consuming devices based on one or more criteria.

19 Claims, 5 Drawing Sheets

(51) Int. Cl.
*G05B 19/00* (2006.01)
*G05B 13/00* (2006.01)

(56) References Cited

U.S. PATENT DOCUMENTS

| | | | |
|---|---|---|---|
| 2016/0097556 A1* | 4/2016 | Seo | G05B 15/02 |
| | | | 700/276 |
| 2017/0108236 A1* | 4/2017 | Guan | G05B 19/04 |

\* cited by examiner

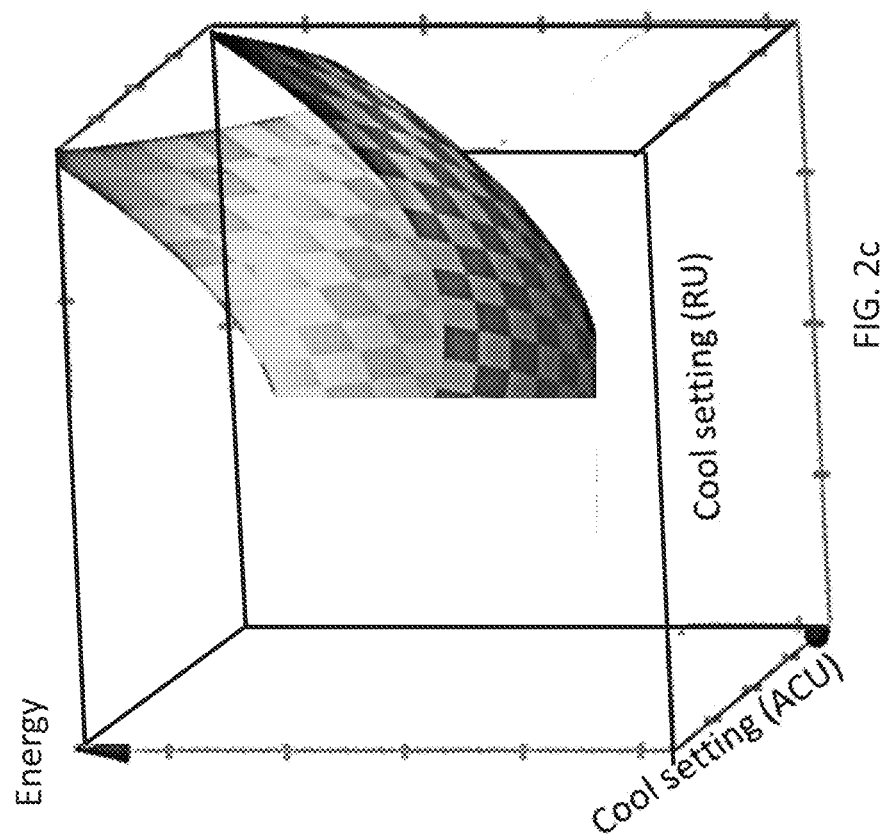

SYSTEM AND METHOD FOR MANAGING ELECTRICAL COMPONENTS FOR ENERGY USAGE

CROSS-REFERENCE TO RELATED APPLICATIONS

The present application is related to and claims the benefit of U.S. Prov. Pat. App. No. 62/344,193, filed Jun. 1, 2016, the contents of which is hereby incorporated by reference in its entirety into this disclosure.

STATEMENT REGARDING FEDERALLY SPONSORED RESEARCH OR DEVELOPMENT

This invention was made with government support under DE-EE0005530 awarded by the Department of Energy. The government has certain rights in the invention.

FIELD OF DISCLOSURE

The present disclosure relates generally to a system and method for electrical component management, and, more particularly, to a system and method for electrical component management in real-time.

BACKGROUND OF DISCLOSURE

This section introduces aspects that may help facilitate a better understanding of the disclosure. Accordingly, these statements are to be read in this light and are not to be understood as admissions about what is or is not prior art.

Energy efficiency has become more important throughout recent years. For instance, in 2011, the International Organization for Standardization released ISO 50001 outlining requirements for organizations to improve energy management. The standard aims to help organizations continually reduce their wasted energy use, and therefore their energy costs and their greenhouse gas emissions.

To reach high energy efficiency for a given piece of equipment or a system of equipment, a user must obtain knowledge of the performance of the equipment, have tools that provide options for improving the performance, including recommended key parameters that may be adjusted, associated operating costs, adjustment needs, and the effects of any adjustments, as well as the method to assess the effects.

Some energy efficiency measures are known and may be out of necessity for a system of equipment. For example, in a motor vehicle, when the starter motor is activated, the other high-energy consuming devices (e.g., headlights) are deactivated. However, such an energy management arrangement is performed manually (i.e., by bypassing all accessory energy usage when the starter motor is activated). Since there is no active or dynamic energy management system in motor vehicles, various equipment (e.g., alternator, battery, etc.) have to be designed for the worst-case scenario.

Additionally, energy consumption during peak hours results in premium fees. Typically, a large portion of an electric bill is due to usage during peak hours in the course of a day.

Therefore, there is an unmet need to dynamically manage energy consumption for a piece of equipment, or a system of equipment.

SUMMARY OF DISCLOSURE

A system for managing performance of one or more electrical components in real-time is disclosed. The system includes one or more sensors coupled to one or more energy consuming devices and adapted to provide working conditions of the one or more energy consuming devices. The system further includes one or more actuators coupled to and configured to control the one or more energy consuming devices. Additionally, the system includes a computing device in electrical communication with the one or more sensors and the one or more actuators. The system also includes a database capable of retaining an instruction program for the computing device. The computing device includes a processor that is configured to receive data from the one or more sensors, analyze data from the one or more sensors, and execute the instruction program received from the database in order to optimize operation of the one or more energy consuming devices based on one or more criteria.

A method for managing performance of one or more energy consuming devices is disclosed. The method includes providing one or more sensors coupled to one or more energy consuming devices and adapted to provide working conditions of the one or more energy consuming devices. The method further includes providing one or more actuators coupled to and configured to control the one or more energy consuming devices. Additionally, the method includes providing a computing device in electrical communication with the one or more sensors and the one or more actuators. The method also includes providing a database capable of retaining an instruction program for the computing device. The computing device includes a processor that is configured to receiving data from the one or more sensors, analyzing data from the one or more sensors, and executing the instruction program received from the database in order to optimize operation of the one or more energy consuming devices based on one or more criteria.

BRIEF DESCRIPTION OF THE DRAWINGS

The foregoing aspects and many of the intended advantages of this disclosure will become more readily appreciated as the same becomes better understood by reference to the following detailed description when taken in conjunction with the accompanying drawing.

FIG. 2C is a three-dimensional graph of energy as a function of cool setting for the air conditioning unit of FIG. 2A and cool setting for refrigeration unit of FIG. 2B, according to the present disclosure.

Figure 1:
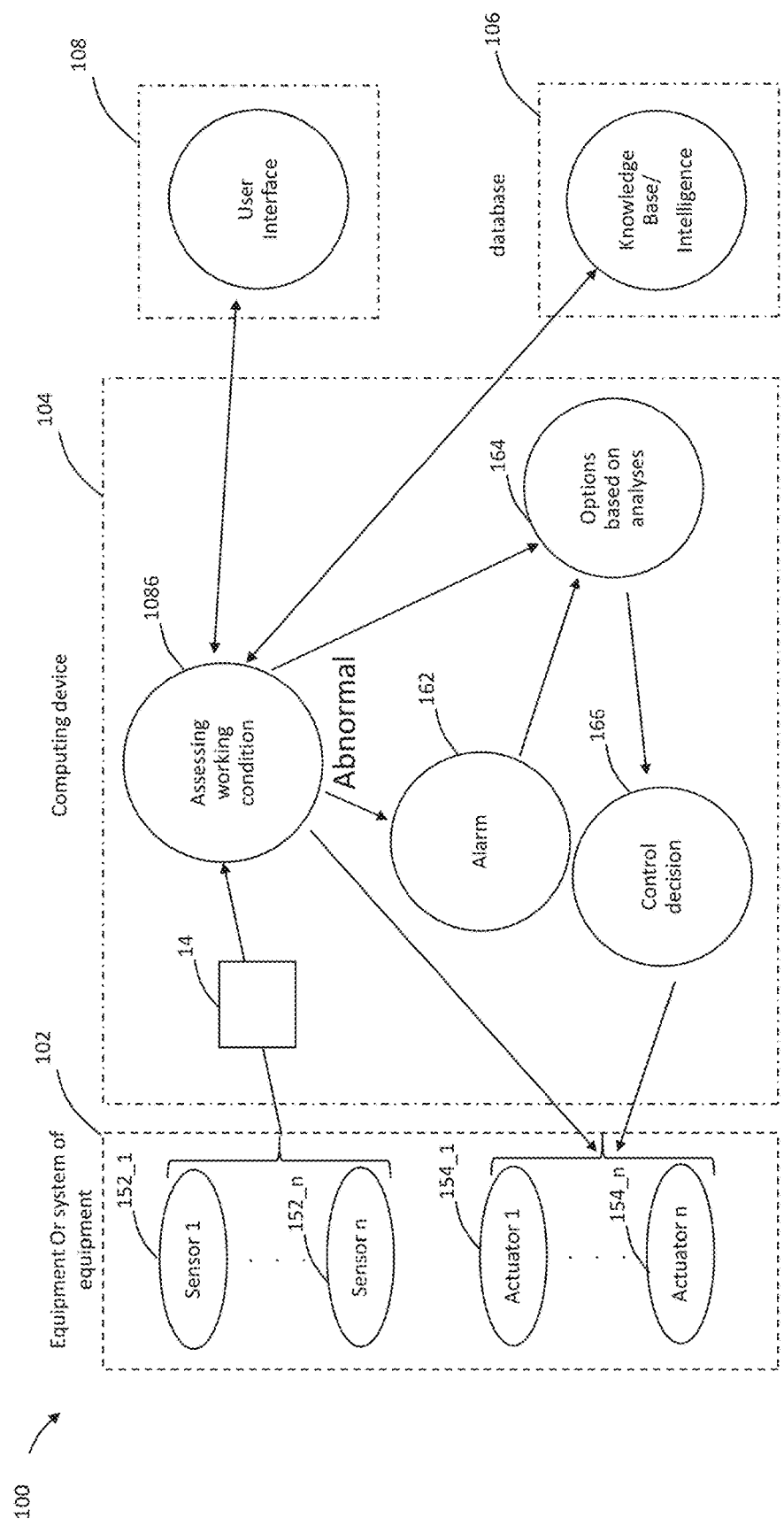
FIG. 1 is a schematic view of an embodiment of a system for managing one or more energy consuming devices according to the present disclosure.

Although the drawing represents an embodiment of various features and components according to the present disclosure, the drawing is not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purposes of promoting an understanding of the principals of the disclosure, reference will now be made to the embodiment illustrated in the drawing, which is described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The operator and/or in the present disclosure means any combination of logical conjunction and logical disjunction between element or elements preceding and element or elements proceeding the and/or operator.

A system and method are disclosed for managing the performance of a piece of equipment or an electrical component in real-time. For instance, the disclosed system and method may be used for monitoring and/or controlling energy efficiency or other performance parameters of a compressor, a boiler, a chiller, an air handling unit, and/or any other piece or a plurality of equipment capable of consuming energy.

Referring to FIG. 1, a system 100 for managing energy and performance is depicted. Generally, the system 100 includes an energy consuming equipment or system of equipment (also referred to hereinafter as plant) 102, a computing device 104 (similar to the system 1000 in FIG. 4), a database 106 (similar to a data storage system 1040 in FIG. 4), and a user interface 108 (similar to the user interface system 1030 in FIG. 4). The plant 102 includes one or more sensors 152_1 ... 152_n (similar to peripheral systems in FIG. 4) measuring environmental conditions associated with one or more energy consuming devices (not shown) controlled by one or more actuators 154_1 ... 154_n. The computing device (also hereinafter referred to as controller) 104 receives electrical signals from the one or more sensors 152_1-152_n by a processor 1086 (described further in reference to FIG. 4) which assesses the working condition of the one or more energy consuming devices (not shown) and further controls the one or more actuators 154_1-154_n controlling the one or more energy consuming devices (not shown). The processor 1086 communicates with the one or more sensors 152_1-152_n via a multichannel data acquisition or management system 14. Additionally, in various embodiments, system 100 utilizes the user interface 108 capable of receiving and transmitting data to and from the processor 1086 such that a user may set up system 100, monitor and adjust performance of energy consuming devices (not shown) in real-time. In various embodiments, the user interface device 108 is configured to receive and transmit data to and from data acquisition system 14 directly (not shown) or through the database 106 via the processor 1086. The processor 1086 may be part of a computer (as described below with reference to FIG. 4) and with dedicated control software. The user interface device 108 may be a tablet computer, mobile phone or any other remote enabled device (e.g., via WiFi, cellular connectivity, etc.). The database 106 is communicatively coupled to the processor 106 via direct communication link (e.g., via local area network) or remote communication links (e.g., via WiFi, cellular, internet) as a cloud-based database. The database 106 contains historical data associated with energy consuming devices (not shown), historical data associated with peak energy usage during course of a day, threshold settings for each of the energy consuming devices (not shown), allowable deviation from each such threshold (i.e., acceptable error for operating an energy consuming device), etc.

The one or more sensor 152_1-152_n of the system 100 may be capable of monitoring a variety of parameters of component(s) (not shown). For instance, one such sensor 152_1 may be capable of measuring current, energy efficiency, voltage, pressure, carbon dioxide levels, flow rates, occupancy, vibration, force, temperature, displacement, velocity, acceleration, and any other similar parameter of an associated energy consuming device (not shown). Furthermore, in various embodiments, the one or more sensor 152_1-152_n may be in wired and/or wireless communication with the data acquisition system 14. Moreover, in some embodiments, one or more sensors 152_1-152_n may be in wireless communication with the energy consuming device (not shown) directly or indirectly through the data acquisition system 14 and database 106. Furthermore, in various embodiments, system 100 may include one or more sensors 152_1-152_n on each of the energy consuming devices (not shown) for monitoring a plurality of parameters, while in other various embodiments, system 100 may include one or more sensors 152_1-152_n for monitoring a common parameter each on a plurality of energy consuming devices (not shown).

In various embodiments, the processor 1086 may be configured with an algorithm to convert parameter data from one or more sensors 152_1-152_n into digital signals containing useable information capable of being displayed by the computing device 104 and/or user interface device 108 to convert control instruction into usable signals for controlling the performance of the energy consuming device (not shown). In various embodiments, data from one or more sensors 152_1-152_n may be transmitted to data acquisition system 14 and then to the database 106 without being processed. In other various embodiments, raw data from the one or more sensors 152_1-152_n may be converted by the processor 1086, and then transmitted to the database 106 prior to being the user interface device 108. The data may be processed using models stored in the database 106 and installed in the user interface device 108 to link them to the energy usage, calculate cost, optimize the system's energy efficiency, and assessing performance improvement by comparing with the legacy data stored in the database 106. The calculated performance information will also be stored in the database 106 for updating the legacy data. In general, the user interface device 108 is capable of accessing information from the database 106 or transmitting information to the database 106 using an application or program downloaded to the user interface device 108. In various embodiments, the program may be updated based on legacy data stored in the database 106 and/or best practice for further improvement.

In continued reference to FIG. 1, if the processor 108B determines there is an abnormality with the threshold setting of one of more energy consuming devices (not shown) based on the one or more sensors 152_1-152_n, the processor starts an alarm program (as shown with block 162) which initiates an option-based analysis program (as shown in block 164) where various options are assessed. These options can be based on a predetermined schedule uploaded from the database 106 apriori, or dynamically based on recent updates to the database 106 as it is updated with more up-to-date information. Options may include restarting the energy consuming device (not shown) which has caused the alarm, or other remedial actions. These actions are taken at the control decision block (166) which in turn activates one or more actuators 154_1-154_n as prescribed by the processor 108B.

Figure 2A:
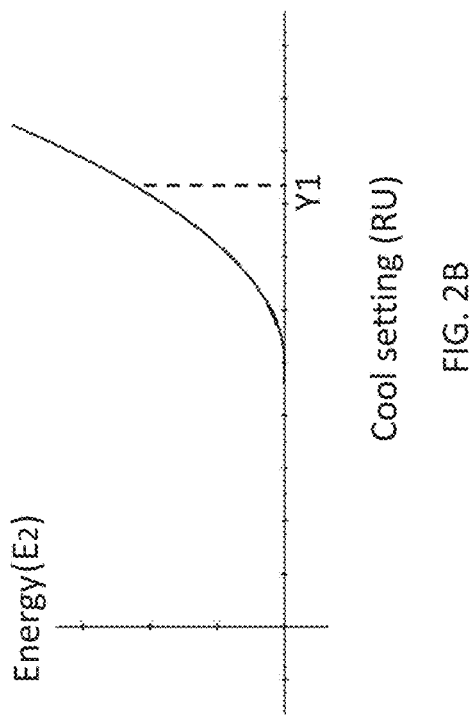
FIG. 2A is two-dimensional graph of energy as a function of cool setting for an air conditioning unit, according to the present disclosure.
Figure 2B:
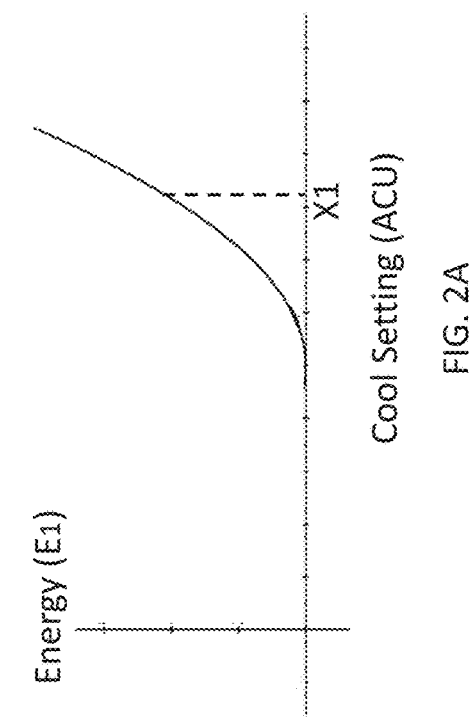
FIG. 2B is two-dimensional graph of energy as a function of cool setting for refrigeration unit, according to the present disclosure.

Further referring to FIG. 1, the processor 108B is adapted to assess the working conditions of the one or more energy consuming devices (not shown) by analyzing data from the one or more sensors 152_1-152_n. If data from the one or more sensors 152_1-152_n is within acceptable thresholds, the processor 108B continues to control in the one or more energy consuming devices (not shown) in a manner programmed by the database 106 by actuating the one or more actuators 154_1-154_n. Alternatively, the processor 108B may be programmed to reduce the overall energy usage of the one or more energy consuming devices (not shown) in accordance to specific time of day by a multivariate formulaic or numeric analysis to reach a minimum of the energy usage based on flexibilities provided by some of the energy consuming devices (not shown). An example will demonstrate this approach. Suppose there are two energy consuming devices in the plant 102, an air conditioning unit (ACU), and a refrigeration unit (RU). Each of the ACU and RU have threshold settings, e.g., the ACU has a setting of 73° F. while the RU has temperature setting of 10° F. However, the processor 108B can be programmed to have a degree of flexibility for each of the ACU and the RU. For example, the ACU can be operated to have an upper limit of 78° F. and the RU can be operated to have an upper limit of 25° F. Operating both ACU and the RU at times when energy consumption for a community is at a peak (e.g., during afternoon hours in the summer time) will lead to substantial overages in electric bills. To avoid these overages, the processor 108B can operate the ACU and the RU in a manner within their allotted flexibilities to minimize energy usage. Energy consumed for the ACU may be expressed as a function of x in the form of $E_1=f_1(x)$, where $E_1$ is the energy and x is the cool setting (in this example, X1 represents a cool setting that can achieve 73° F.). Similarly, energy consumed for the RU can be described as a function of y in the form of $E_2=f_2(y)$, where $E_2$ is the energy and y is the cool setting (in this example Y1 represent a cool setting that can achieve 10° F.). For both of these functions higher values on the abscissa represents colder settings. The relationship of $E_1=f_1(x)$ and $E_2=f_2(y)$ are shown in FIGS. 2A and 2B as nonlinear functions between energy and cool settings, respectively. Adding the right-hand side of these equations provides $E_T=f_1(x)+f_2(y)$, where $P_T$ is the total energy used by the ACU and the RU. Referring to FIG. 2C, a three-dimensional graph of $E_T$ is shown. As a first order approximation, it will be assumed that x and y (i.e., cool settings of ACU and RU) are independent of one another. In one embodiment of the present disclosure, each device in the plant may also be given a weight, for example a weight of 100 may mean than all attempts must be taken to meet the threshold setting of the energy consuming device associated with that weight. Alternatively, a low weight such as, for example 1, may mean that energy consuming device is of least importance in the plant and it can be powered on and off more liberally although still within the flexibility of the device. By applying either a formulaic solution or a numerical solution within the boundary of the flexibilities of ACU and RU, the minimum energy usage can be determined. In one embodiment, the weight can be used as well to make the modifications. For example, if both the ACU and the RU have equal importance (i.e., no difference in the weight associated with which one can be deactivated in favor of the other), then alternate cycling of the ACU and the RU may be one approach to reducing energy. Another approach may be to alternate cycle the ACU and RU based on the relative proportion of their energy usage. For example, the ACU may consume 5 times as much energy and the RU. A ⅕ proportion in alternate cycling may be another approach to reduce energy. In all these various approaches, each of the ACU and the RU may not exceed the threshold plus the available flexibility. While, minimizing energy is the goal of optimization according to the above example, the optimization approach can be used for any parameter. For example, in a motor vehicle, the optimization can be used to reduce the size of an alternator based on selectively operating one or more energy consuming devices (e.g., amplifier of sound system, air conditioning, etc.). In other examples, the optimization can be used to maximize a parameter. For example, optimization can be used to maximize efficiency.

One system 100 is set up, an application as discussed with reference to flowchart 200, is downloaded on the computing device 104 and user interface device 108, and the system 100 begins to operate the one or more actuators 154_1-154_n in order to control the energy consuming devices (not shown). To begin, the application may ask the user to login with password. Then application may ask the user to choose a default mode or an interactive mode, as collectively shown in blocks 202, 204, 206, 208, and 210. The default mode is for a user that has already set up the application in connection with a given system and wishes to monitor component performance remotely, while the interactive mode is for a user wanting to set up a connection with a system in order to monitor component performance.

If the user selects the default mode, the application may activate system 100 to perform data collection such that raw data or converted data transmitted from data acquisition system 14 to cloud-based database 106 can be relayed to user interface device 108 such that a user may monitor the performance of an energy consuming device (not shown) in real-time. The user may then use the information provided to adjust parameters of the energy consuming device (not shown) using user interface device 108.

If the user selects the interactive mode (i.e., not the default mode), the processor 108B identifies a wireless router to connect to, and/or sets up limits for the one or more sensors 152_1-152_n of the system 100. The limits of each sensor may include lower and upper measuring limits warning thresholds, among other things. Once the setup is complete, the user is able to receive data from cloud-based database 106 similar to the default mode described above such that the user may monitor the performance of the coupled components, as shown in blocks 212, 214. 216, 218, 220, 222, and 224.

Figure 3:
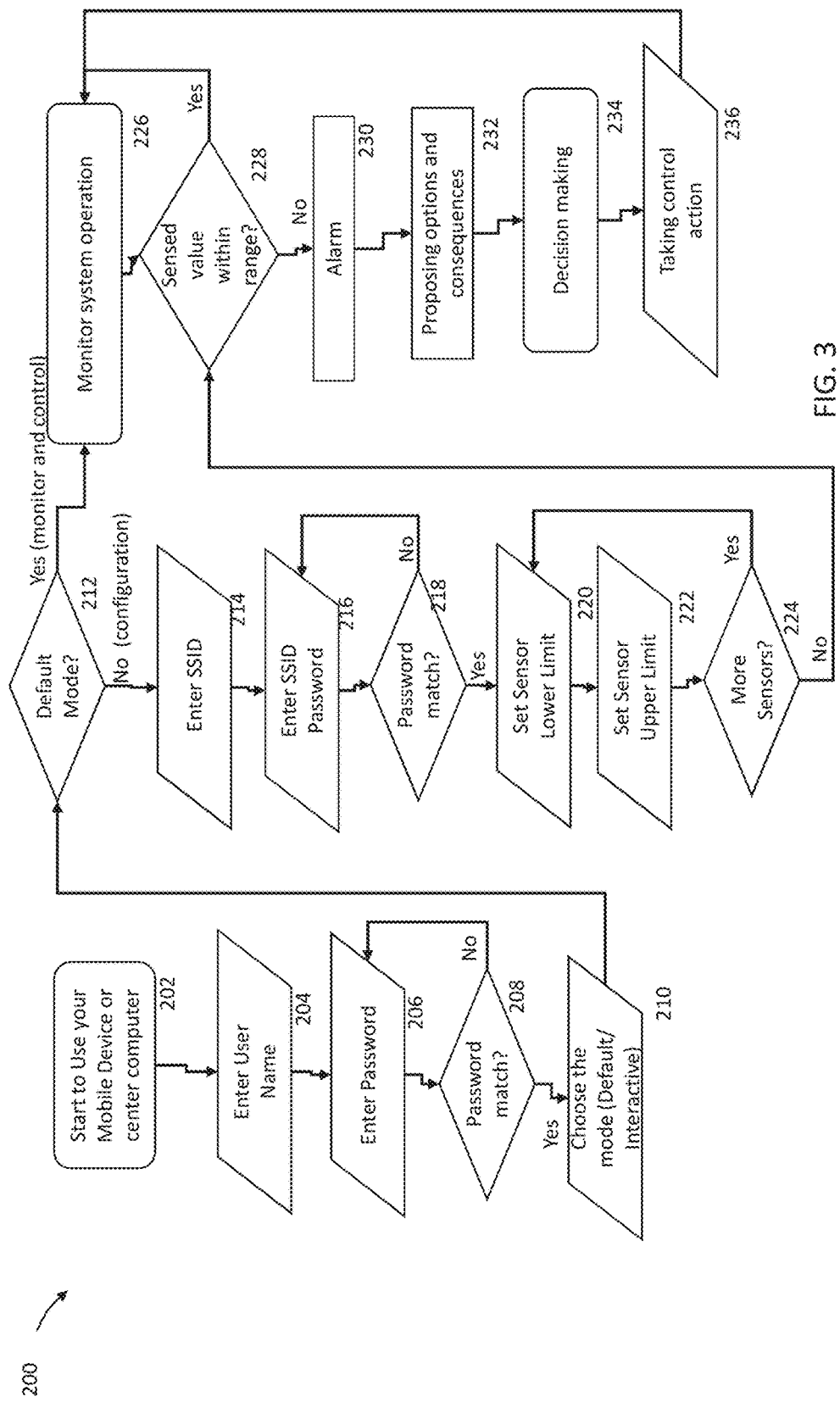
FIG. 3 is a flow diagram characterizing the operation of the system for managing one or more energy consuming devices of FIG. 1.

Still referring to FIG. 3, in various embodiments, system 100 may be capable of issuing a warning or alarm when a certain threshold or limit for a parameter is surpassed. Warnings or alarms may be received and displayed by the user interface device 108 independent of the application being open and/or in use, as shown in blocks 226, 228, 230, 232, 234, and 236.

The system 100 has a knowledge base module in the cloud-based database 106. The knowledge base module stores algorithms, look-up tables, and parameters specified for different energy consuming devices (not shown). The module includes developed computational models of sub-systems of the equipment or system of equipment, legacy performance data, lookup tables resulting from previous analyses, and knowledge learned from previous operations. When a project is initiated, the related models and the related system will be retrieved from the database 106. When a warning or an alarm is issued, system 10 obtains the relevant recommendations and algorithms from the knowledge base and calculates the energy savings or cost difference of fixing and not fixing the problem triggering the warning. system 100 then displays this information to the user through the user interface device 108. In various embodiments, the thresholds and/or limits may be set or adjusted based on the user's preference.

In response to warnings, unsatisfactory performance information or other information received and/or displayed by the user interface device 108, the user in a manual mode or the system 100 in an automatic mode may review the recommendations, assess the advantages and disadvantages if control parameters are adjusted, adjust the parameters of each actuator 154_1-154_n and assess the effects. For example, if component (not shown) is an air handling unit, a temperature, a valve setting, or other similar parameter or setting of the air handling unit may be adjusted. In addition, in various embodiments, the system 100 may report the increase or decrease in energy efficiency or cost savings or increases based on proposed or actual adjustment recommendations to a given parameter. Furthermore, in various embodiments, information such as data received, actions taken, outcomes, or other similar information may be stored in the knowledge base module of the database 106, or a memory located in data acquisition system 14, or the user interface device 108.

Figure 4:
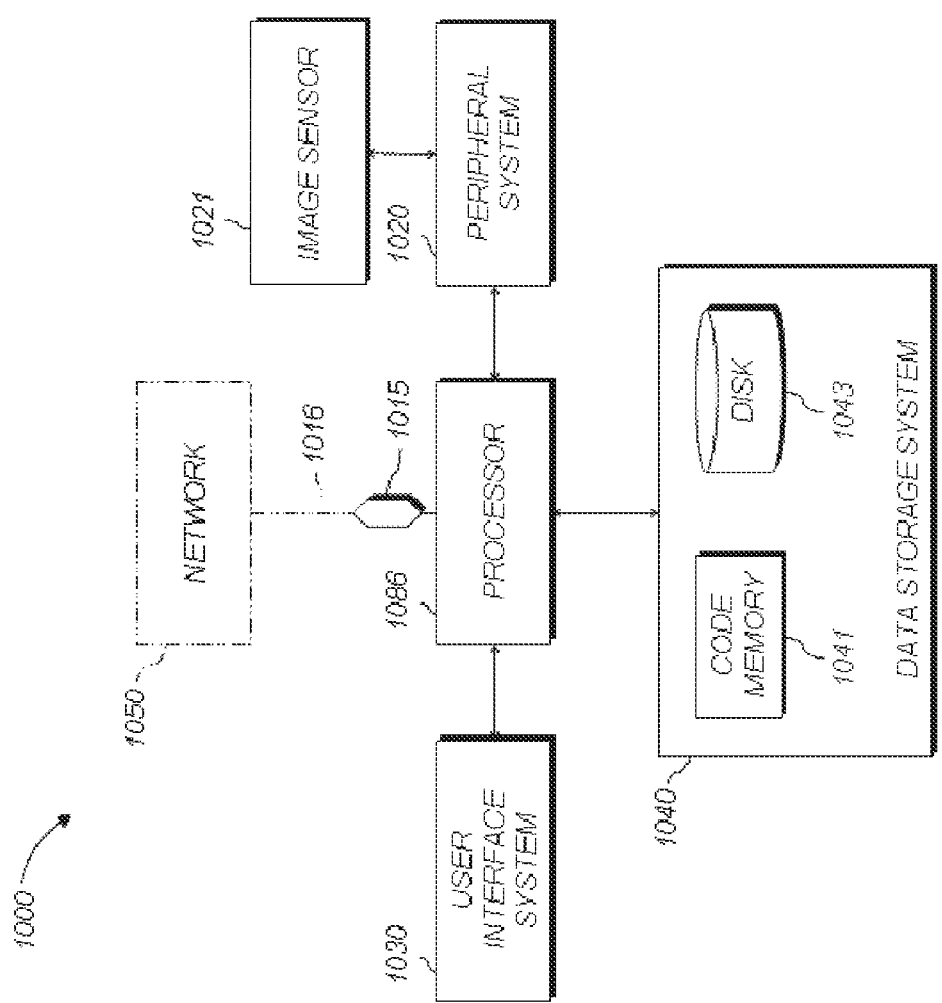
FIG. 4 is a high-level diagram showing components of an exemplary data-processing system, according to the present disclosure.

Referring to FIG. 4, a high-level diagram showing the components of an exemplary data-processing system 1000 for analyzing data and performing other analyses described herein, and related components. The system 1000 includes the processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The imaging described in the present disclosure may be obtained using imaging sensors 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include sensors capable of communicating data associated with operational conditions (e.g., current, voltage, temperature) of energy consuming devices, digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for managing performance of one or more electrical components in real-time comprising:
   one or more sensors coupled to one or more energy consuming devices and adapted to provide working conditions of the one or more energy consuming devices;
   one or more actuators coupled to and configured to control the one or more energy consuming devices;
   a computing device in electrical communication with the one or more sensors and the one or more actuators; and
   a database adaptable to retain historical system data and software programs for the computing device,
   the computing device having a processor configured to
      receive data from the one or more sensors,
      analyze data from the one or more sensors, and
      execute the software programs received from the database and operate the one or more actuators following a selected recommendation based on one or more of computational models of the system, the historical system data, lookup tables based on historical data in order to optimize operation of the one or more energy consuming devices based on one or more criteria,
      evaluate system operations based on the one or more criteria, issue at least one warning in response to the system's deviations from the one or more criteria, obtain one or more proposed recommendations from the computing device associated with corrective actions corresponding to the at least one warning, provide the one or more proposed recommendations, assess proposed effects if executing the corrective actions associated with the one or more proposed recommendation, report the assessed proposed effects, establish a recommendation as the established recommendation based on the assessed effects associated with each proposed recommendation actually implement the corrective actions associated with the established recommendation, assess actual effects associated with executing the corrective actions corresponding with the established recommendation, and report the assessed actual effect.

2. The system of claim 1, further comprising a data acquisition system disposed between the one or more sensors and the processor and configured to route data from the one or more sensors to the processor.

3. The system of claim 2, wherein the data acquisition system is in wired communication with the one or more sensors.

4. The system of claim 2, wherein the data acquisition system is in wireless communication with the one or more sensors.

5. The system of claim 1, further comprising a user interface device in electronic communication with the processor and adapted to receive operational data from the one or more sensors and control the one or more actuators.

6. The system of claim 5, wherein the user interface device is configured to receive data from the one or more sensors and control the one or more actuators directly.

7. The system of claim 5, wherein the user interface device is configured to receive data from the one or more sensors and control the one or more actuators via the processor.

8. The system of claim 1, the processor is configured to perform optimization based on a numerical solution.

9. The system of claim 8, the numerical solution is based on steepest descent approximation.

10. The system of claim 1, where for each energy consuming device a threshold is specified and a corresponding flexibility for deviating from the respective threshold and a weight associated with each flexibility is specified.

11. A method for managing performance of one or more energy consuming devices, comprising:

providing one or more sensors coupled to one or more energy consuming devices and adapted to provide working conditions of the one or more energy consuming devices;

providing one or more actuators coupled to and configured to control the one or more energy consuming devices;

providing a computing device in electrical communication with the one or more sensors and the one or more actuators; and providing a database adaptable to retain historical system data and software programs for the computing device, the computing device having a processor configured to receiving data from the one or more sensors, analyzing data from the one or more sensors, and executing the software programs received from the database and operate the one or more actuators following a selected recommendation based on one or more of computational models of the system, the historical system data, lookup tables based on historical data in order to optimize operation of the one or more energy consuming devices based on one or more criteria, evaluating system operations based on the one or more criteria, issuing at least one warning in response to the system's deviations from the one or more criteria, obtaining one or more proposed recommendations from the computing device associated with corrective actions corresponding to the at least one warning, providing the one or more proposed recommendations, assessing proposed effects if executing the corrective actions associated with the one or more proposed recommendation, reporting the assessed proposed effects, establishing a recommendation as the established recommendation based on the assessed effects associated with each proposed recommendation actually implementing the corrective actions associated with the established recommendation, assessing actual effects associated with executing the corrective actions corresponding with the established recommendation, and reporting the assessed actual effect.

12. The method of claim 11, further comprising providing a data acquisition system disposed between the one or more sensors and the processor and configured to routing data from the one or more sensors to the processor.

13. The method of claim 11, further comprising providing a user interface device in electronic communication with the processor and adapted to receiving operational data from the one or more sensors and controlling the one or more actuators.

14. The method of claim 11, the processor is configured to performing optimization based on a numerical solution.

15. The method of claim 14, the numerical solution is based on steepest descent approximation of energy consumption.

16. The method of claim 13, where for each energy consuming device a threshold is specified and a corresponding flexibility for deviating from the respective threshold and a weight associated with each flexibility is specified.

17. The method of claim 13, further comprising:

transmitting data associated with the one or more sensors to the database and to the user interface device.

18. The method of claim 16, further comprising:

transmitting an alarm to the user interface device when operational data from the one or more sensors indicate operation outside of the threshold for the one or more energy consuming devices.

19. The method of claim 11, further comprising:

providing computational models to optimize the performance of the one or more energy consuming devices and estimate cost and energy consumption when one or more parameters associated with the one or more energy consuming devices are adjusted.

* * * * *